US012398583B2

(12) United States Patent
Graute

(10) Patent No.: US 12,398,583 B2
(45) Date of Patent: Aug. 26, 2025

(54) MOTOR VEHICLE LOCK

(71) Applicant: Brose Schließsysteme Gmbh & Co. Kommanditgesellschaft, Wuppertal (DE)

(72) Inventor: Ludger Graute, Essen (DE)

(73) Assignee: Brose Schließsysteme GmbH & Co. Kommanditgesellschaft (DE)

( * ) Notice: Subject to any disclaimer, the term of this patent is extended or adjusted under 35 U.S.C. 154(b) by 0 days.

(21) Appl. No.: 17/916,849

(22) PCT Filed: Mar. 31, 2021

(86) PCT No.: PCT/EP2021/058542

§ 371 (c)(1),
(2) Date: Oct. 4, 2022

(87) PCT Pub. No.: WO2021/198393

PCT Pub. Date: Oct. 7, 2021

(65) Prior Publication Data

US 2023/0160237 A1 May 25, 2023

(30) Foreign Application Priority Data

Apr. 4, 2020 (DE) ..................... 10 2020 109 473.6

(51) Int. Cl.
*E05B 77/04* (2014.01)
*E05B 15/00* (2006.01)
*E05B 85/26* (2014.01)

(52) U.S. Cl.
CPC .......... *E05B 77/04* (2013.01); *E05B 15/0086* (2013.01); *E05B 85/26* (2013.01)

(58) Field of Classification Search
CPC ...... E05B 15/0086; E05B 85/26; E05B 77/04; E05B 77/06; E05B 77/12; Y10T 292/1082; Y10T 292/1047; Y10S 292/22
See application file for complete search history.

(56) References Cited

U.S. PATENT DOCUMENTS 5,505,506 A * 4/1996 Kleefeldt ................ E05B 77/34 292/216
11,098,508 B2 * 8/2021 Schiffer .................. E05B 81/66
(Continued)

FOREIGN PATENT DOCUMENTS

DE 102012102724 A1 10/2013
DE 202013104118 U1 12/2014
(Continued)

OTHER PUBLICATIONS

Chinese Office Action for CN 202180026430.9, English Translation attached to Original, Dated Apr. 26, 2025, All together 14 Pages.

*Primary Examiner* — Christine M Mills
*Assistant Examiner* — Yahya Sidky
(74) *Attorney, Agent, or Firm* — Dickinson Wright PLLC

(57) ABSTRACT

A motor vehicle lock including a latch pivotable about a latch axis to an opening position and to a closing position. In the assembled state, the latch is in retaining engagement with a striker in the closing position, and in the opening position, the latch releases the striker, a blocking mechanism configured to be brought into a blocking state to block the latch in the closing position, and configured to be brought into a release state to release the latch to the opening position. The blocking mechanism including a pawl assembly including a pawl pivotally mounted via a pivot bearing and configured for blocking engagement with the latch. A crash blocking surface is provided so during a crash, when the pawl or the pivot bearing yields from deformation, an engaging surface of the pawl engages the crash blocking surface, to dissipate crash forces the crash blocking surface.

17 Claims, 3 Drawing Sheets

(56) References Cited

U.S. PATENT DOCUMENTS

| | | | | |
|---|---|---|---|---|
| 2011/0133491 | A1 * | 6/2011 | Perkins | E05B 77/10<br>292/216 |
| 2018/0195322 | A1 | 7/2018 | Schiffer | |
| 2019/0024424 | A1 * | 1/2019 | Brickner | E05B 77/04 |

FOREIGN PATENT DOCUMENTS

| | | | | |
|---|---|---|---|---|
| DE | 102015001906 | A1 | 8/2016 | |
| DE | 102018117696 | A1 | 1/2020 | |
| DE | 102019112525 | A1 | 11/2020 | |
| EP | 1489252 | A2 * | 12/2004 | E05B 81/20 |
| EP | 2492423 | A2 | 8/2012 | |
| WO | 2020228910 | A1 | 11/2020 | |

* cited by examiner

MOTOR VEHICLE LOCK

CROSS-REFERENCE TO RELATED APPLICATIONS

This application is the U.S. National Phase of PCT Application No. PCT/EP2021/058542 filed on Mar. 31, 2021, which claims priority to German Patent Application No. DE 10 2020 109 473.6, filed on Apr. 4, 2020, the disclosures of which are hereby incorporated in their entirety by reference herein.

TECHNICAL FIELD

The present disclosure relates to a motor vehicle lock.

BACKGROUND

Motor vehicle locks may be assigned to any closure element of a motor vehicle. To this end, tailgates, trunk lids, front hoods, engine hoods, side doors or the like. These closure elements can be configured pivotably or in the manner of sliding doors.

High crash safety is an important requirement in the case of motor vehicle locks. It comes down here to avoiding an undesired opening operation in the case of a crash, even if extraordinarily high crash forces are introduced into the lock latch via a striker.

SUMMARY

The present disclosure may address one or more problems by configuring and developing a motor vehicle lock in such a way that the crash safety is increased.

A certain amount of deformation-induced yielding of a locking pawl or the pivot bearing of the locking pawl due to crash forces transmitted by the locking part is generally acceptable. In order to nevertheless avoid an undesired opening operation, a crash locking surface is provided, against which the locking pawl can bear in order to dissipate the crash forces. The above yielding stems from a deformation of the locking pawl or the pivot bearing or any components which are coupled to the locking pawl and via which part of the crash forces are dissipated.

According to one embodiment, a crash locking surface is provided, and that an engagement surface of the locking pawl comes into engagement with the crash locking surface in the case of a crash in the event of deformation-induced yielding of the locking pawl or its pivot bearing, which yielding stems from crash forces which are transmitted by the locking part, with the result that at least part of the crash forces are dissipated via the crash locking surface.

By way of the solution according to the proposal, the crash safety can be increased with the application of simple structural means. What is more, by way of the solution according to the proposal, the components of the locking mechanism can be of mechanically weak and therefore inexpensive design, without impairing the targeted rise in the crash safety.

Another embodiment relates to the design of the blocking arrangement for blocking the locking pawl arrangement in the locked state. Here too, a toggle lever mechanism which may have advantages with regard to the utilization comfort is used in one variant.

The crash locking surface and locking pawl described above may be applied effectively to a two-part locking pawl arrangement. Here, the utilization comfort which accompanies the two-part nature of the locking pawl arrangement is combined with relatively high crash safety.

The above-addressed, inexpensive design of the locking pawl arrangement is manifested by the use of plastic material for at least one part of the locking pawl arrangement. As an example, one or more embodiments relate to the construction of the pivot bearing of the locking pawl from a plastic material, or construction of at least one part of the locking pawl from a plastic material.

In one or more embodiments, at least one part of the carrier pawl, such as the entire carrier pawl, may be formed of a plastic material. As an alternative, however, the carrier pawl may also be at least partially formed of from a metallic material.

Other embodiments relate to the construction of the crash locking surface. A bearing mandrel which is assigned to the pivot bearing of the carrier pawl is used as crash locking surface. In the case of another embodiment, the engagement surface of the locking pawl and the crash locking surface are adapted to one another in such a way that an at least partial positively locking connection between the two surfaces is possible in the case of a crash. In this way, sliding off of the engagement surface of the locking pawl from the crash locking surface can be prevented in a simple way in the case of a crash.

In another embodiment, which can be implemented relatively easily in terms of manufacturing technology for the crash locking surface in that the crash locking surface is connected to a striking plate of the motor vehicle lock or is even formed by the latter. It is conceivable in the last-mentioned case that the crash locking surface is provided by an angled-over edge of the striking plate, with the result that the realization of the crash locking surface is possible without additional components.

As a result, the crash safety of the motor vehicle lock can be increased further with little complexity.

BRIEF DESCRIPTION OF THE DRAWINGS

In the following text, the invention will be explained in greater detail on the basis of a drawing which represents merely one exemplary embodiment and in which.

DETAILED DESCRIPTION

Figure 1:
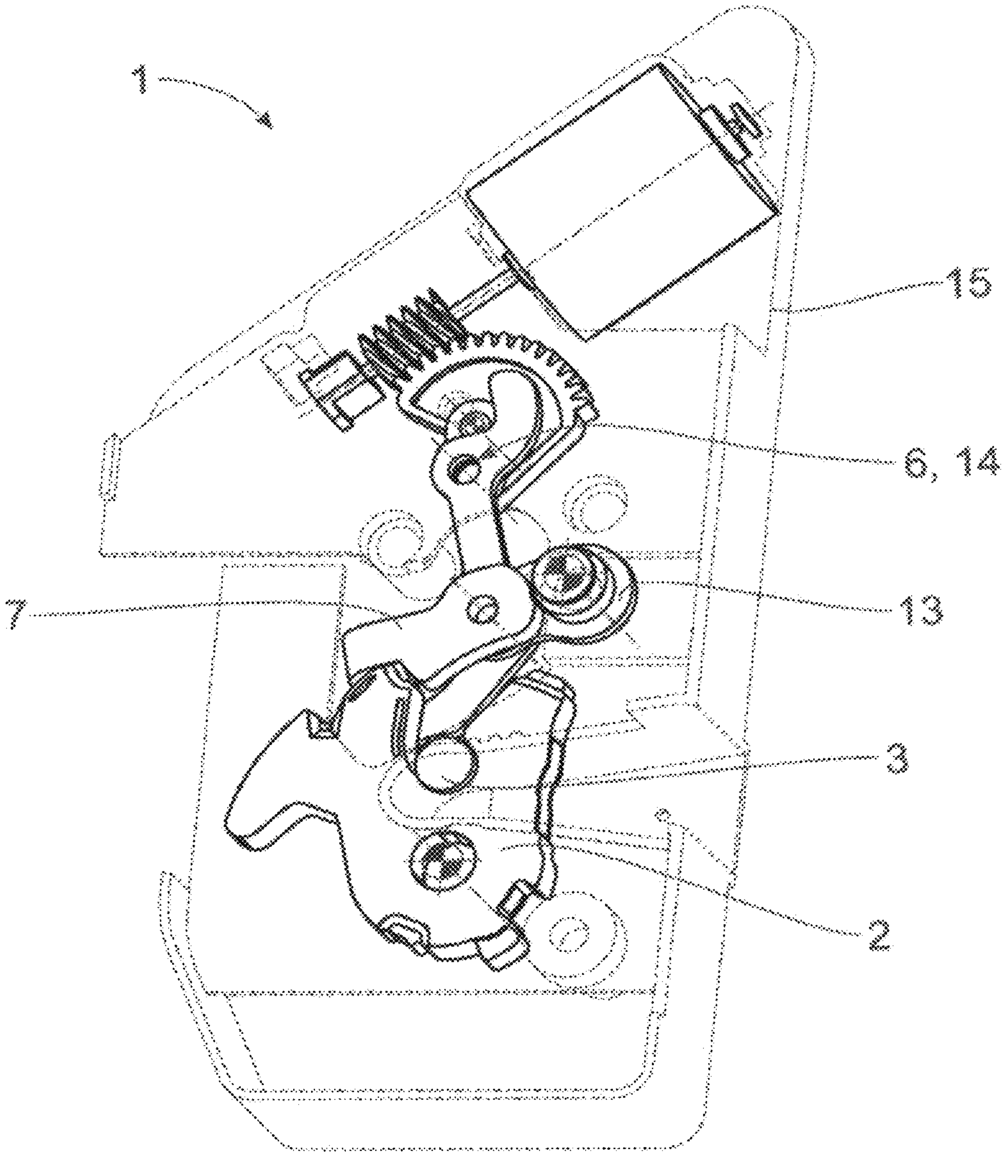
FIG. 1 shows a motor vehicle lock according to the proposal with a lock latch situated in the main locking position, in a perspective illustration.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known motor vehicle lock is described in EP 2 492 423 B1, which includes a lock latch which can be pivoted about a lock latch axis and usually interacts with an above striker. In order to lock the lock latch in its respective closed position, the motor vehicle lock has a locking mechanism consisting of a locking pawl arrangement and a blocking arrangement which blocks the locking pawl arrangement. The locking pawl arrangement is assembled from a carrier pawl and a locking pawl which is mounted pivotably thereon, which carrier pawl and locking pawl provide a toggle lever mechanism. A two-part locking pawl arrangement of this type fundamentally makes high utilization comfort possible with regard to low actuating forces, and low noise development during the closing and opening operation. The connecting joint between the carrier pawl and the locking pawl represents a weak point, however, when it comes down to absorbing the high crash forces addressed above.

The motor vehicle lock 1 which is shown in the drawing can be assigned to any closure element of a motor vehicle. In this respect, reference may be made to the general part of the description.

Figure 2:
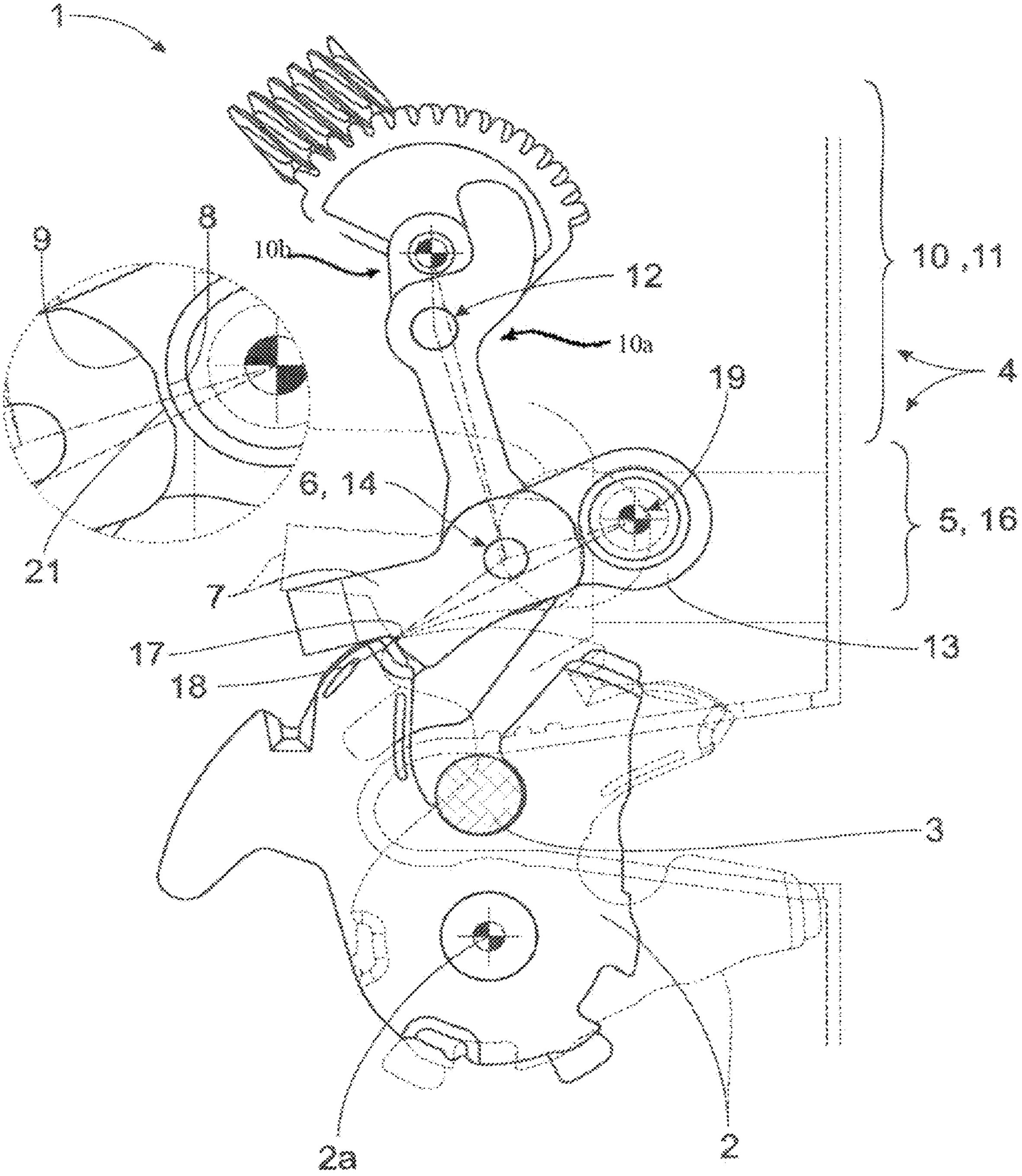
FIG. 2 shows the motor vehicle lock according to FIG. 1 in a plan view.

The motor vehicle lock 1 is equipped with a lock latch 2 which can be pivoted about a lock latch axis 2*a* and can be moved into an open position (dashed line in FIG. 2) and at least one closed position (solid line in FIG. 2). As an example, the lock latch 2 can be moved not only into the main closed position which is shown in FIG. 2, but rather into a pre-closing position (not shown). This is of secondary importance for the solution according to the proposal, however. In the following text, the closed position is always the main closed position. All comments in this regard apply mutatis mutandis to a possible pre-closing position.

In the mounted state, which is shown, the lock latch 2 is in holding engagement in the closed position with a locking part 3, such as a striker. The lock latch 2 releases the locking part 3 in the open position.

In a first variant, the motor vehicle lock 1 is arranged on the associated closure element, whereas the lock part 3 is arranged on the motor vehicle body. This can also be provided the other way around.

In order to hold the lock latch 2 in its respective closed position, the motor vehicle 1 has a locking mechanism 4. The locking mechanism 4 can be moved into a locked state, in which it locks the lock latch 2 in the closed position. This is shown in the drawing. The locking mechanism 4 can be moved, furthermore, into a release state, in which it releases the lock latch 2 in its open position. The release state is not shown in the drawing.

The locking mechanism 4 has a locking pawl arrangement 5 with a locking pawl 7 which is mounted via a pivot bearing 6 for locking engagement with the lock latch 2.

It is essential that a crash locking surface 8 is provided, and that an engagement surface 9 of the locking pawl 7 comes into engagement with the crash locking surface 8 in the case of a crash in the event of deformation-induced yielding of the locking pawl 7 or its pivot bearing as a result of crash forces which are transmitted by the locking part 3, with the result that at least part of the crash forces are dissipated via the crash locking surface 8. This can be gathered from the illustration according to FIG. 3. In the case of a crash, high crash forces $C_1$, $C_2$, $C_3$, $C_4$ act from the blocking part 3 on the block latch 2, which crash forces $C_1$, $C_2$, $C_3$, $C_4$ are sustained via the lock latch 2 and the locking pawl 7 and are dissipated by the crash locking surface 8. All forces and torques which stem from the interaction between the blocking part 3 and the lock latch 2 in the case of a crash are combined under the term "crash forces".

Furthermore, the locking mechanism 4 has a blocking arrangement 10 which serves to block the locking pawl arrangement 5 in the locked state. The arrangement is namely provided in such a way that the locking pawl arrangement 5 would leave the locked state immediately, driven by way of the lock latch 2, if the blocking arrangement 10 did not exert a blocking action on the locking pawl arrangement 5.

The blocking arrangement 10 has a first blocking lever 10*a* and a second locking lever 10*b* which configure a toggle lever mechanism 11 for blocking the locking pawl arrangement 5 and are coupled to one another via a toggle lever 12.

The drawing shows the locking mechanism 4 in its locked state. The blocking arrangement 10 can then be actuated within the context of an opening operation, such that the locking mechanism 4 is transferred from the illustrated locked state into the release state. This also plays merely a minor role for the solution according to the proposal.

For the locking of the lock latch 2, the locking pawl arrangement 5 has, in addition to the locking pawl 7, a carrier pawl 13 which is coupled to the locking pawl 7 such that it can be pivoted via a connecting joint 14. Here, the connecting joint 14 may provide the pivot bearing 6 of the locking pawl 7. As an alternative, the locking pool 7 can be mounted on a pivot bearing which is fixed on the housing. The term "fixed to the housing" is always in relation to the lock housing 15. Here, the term "lock housing" is to be interpreted broadly. To this extent, it comprises not only a housing in the relatively strict sense, but rather also carrier components such as, for example, a striking plate or the like. The striking plate may be a plate made from a high strength steel which provides the pivot bearings for various lock components, such as for the lock latch 2 and/or the carrier locking pawl 13.

In one or more embodiments, the locking pawl 7 and the carrier pawl 13 likewise configure a toggle lever mechanism 16 via the connecting joint 14. The fact is interesting, however, that the blocking arrangement 10 is coupled or can be coupled to the locking pawl arrangement 5 in the region of the connecting joint 14, for example via the connecting joint 14, in order to block the locking pawl arrangement 5.

At a point which is remote from the associated connecting joint 14, the locking pawl 7 then has at least one locking surface 17 for at least one engagement surface 18 of the lock latch 2, the carrier pawl 13 being mounted via a pivot bearing 19 pivotably, for example, in a manner which is fixed to the housing in relation to the lock housing 15, at a point which is remote from the associated connecting joint 14.

The toggle lever mechanism 16 of the locking pawl arrangement 5 is designed in such a way that it would give way upward in FIG. 2 if the blocking arrangement 10 did not exert a blocking force on the locking pawl arrangement 5 via the connecting joint 14.

The pivot bearing 6 of the locking pawl 7, in particular the connecting joint 14 between the carrier pawl 13 and the locking pawl 7, may be configured at least partially from a plastic material. In view of the illustration according to FIG. 3, this is also appropriate, since any deformation which is produced by way of possible crash forces leads to an engagement between the engagement surface 9 of the locking pawl 7 and the crash locking surface 8.

It can even be provided that at least part of the locking pawl 7 is configured from a plastic material. In another embodiment, one part of the locking pawl 7 is then configured from a metallic material and another part of the locking pawl 7 is configured from a plastic material, in such a way that the dissipation of the crash forces via the crash locking surface 8 takes place substantially via the metallic part of the locking pawl 7, and not via that part of the locking pawl 7 which consists of a plastic.

Figure 3:
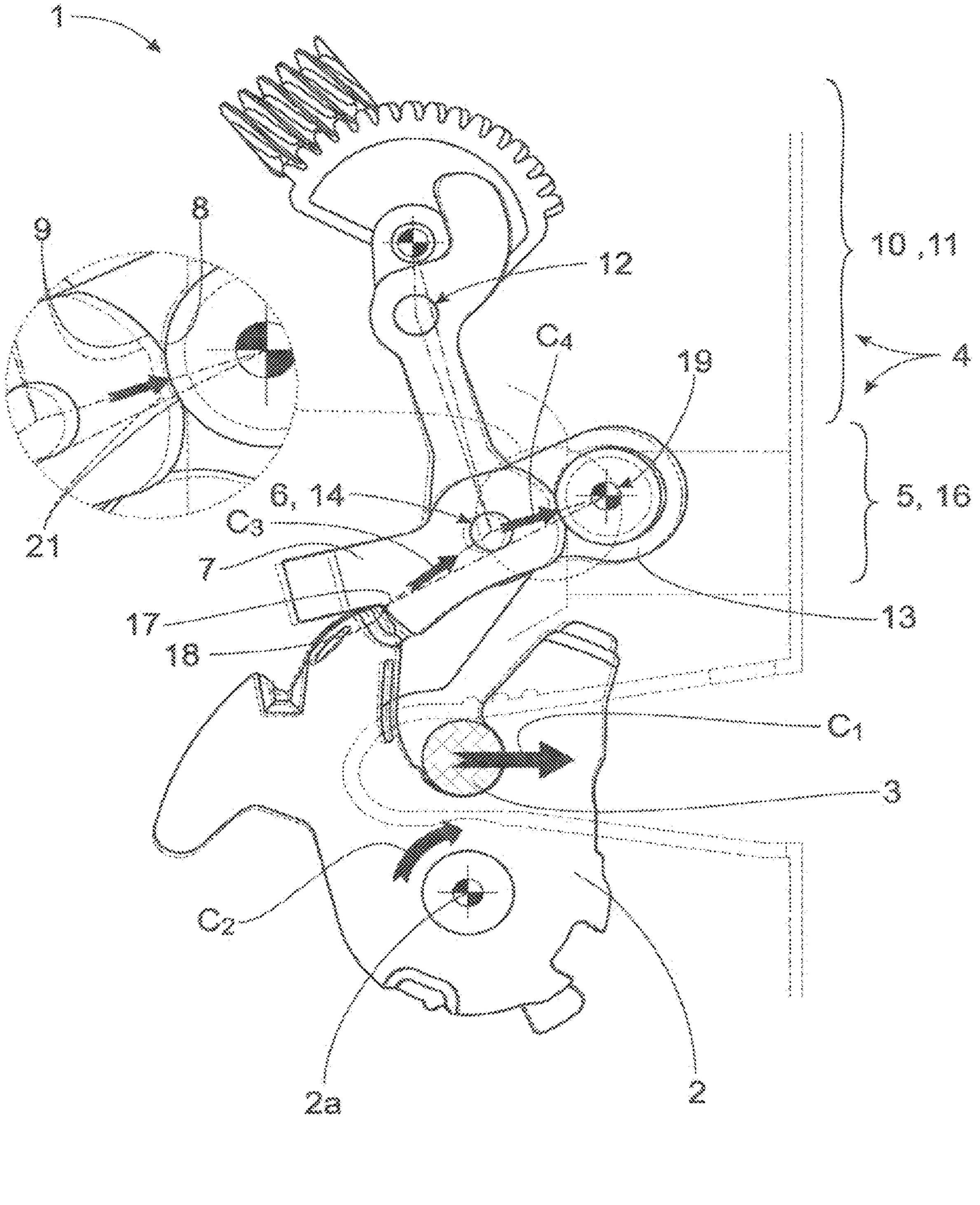
FIG. 3 shows the motor vehicle lock according to FIG. 2 in the case of a crash.

FIG. 3 shows, furthermore, that at least one part of the carrier pawl 13, the entire carrier pawl 13, can be configured from a plastic material, without the crash safety according to the proposal being impaired. In addition or as an alternative, it is also provided, however, that at least one part of the carrier pawl 13, such as the entire carrier pawl 13, is configured from a metallic material.

Various advantageous variants are conceivable for the realization of the crash locking surface 8. Here as an example, the crash locking surface 8 is a constituent part of a bearing journal 20 which is a constituent part of the pivot bearing 19 of the carrier pawl 13. This can be gathered from the illustration according to FIG. 3.

Finally, the illustration according to FIG. 3 shows that the engagement surface 9 of the locking pawl 7 and the crash locking surface 8 are designed in such a way that they can be brought into engagement with one another at least partially in a positively locking manner in the case of a crash. The positively locking connection may be provided in such a way that it acts transversely with respect to the direction of the yielding of the locking pawl 7 or of its pivot bearing 6, in such a way that lateral slipping off transversely with respect to the yielding of the locking pool 7 or of its pivot bearing 6 is avoided by way of the positively locking connection. This is a relatively simple measure for further increasing the crash safety. For this additional positively locking connection, an additional bulge 21 can be seen in the engagement surface 9 of the locking pawl 7 in FIG. 3.

It may also be noted that a crash locking surface 8 which can be implemented relatively simply consists in that the crash locking face 8 is connected to a striking plate of the motor vehicle lock 1 or is formed by it. As addressed above, this leads to a relatively inexpensive embodiment, for example since no additional parts are required for the realization of the crash locking surface 8.

As another example, a further crash locking surface 22 may be provided, and in that an engagement surface 23 of the blocking arrangement 10, such as the first blocking lever 10*a*, comes into engagement with the further crash locking face 22 in the case of a crash in the event of deformation-induced yielding of the blocking arrangement 10 as a result of crash forces which are transmitted by the locking part 3, with the result that at least part of the crash forces are dissipated via the further crash locking surface 22. The associated, increased crash safety can be achieved even if the first blocking lever 10*a* is configured a plastic material.

One of the blocking levers of the blocking arrangement 10 (here, the second blocking lever 10*b*) may be mounted via a pivot bearing 24 such that it can be pivoted at a point which is remote from the toggle lever 12, as an example in a fixed manner in relation to the lock housing 15. This results in an above toggle lever mechanism 11, by way of which high blocking forces can be transmitted via the blocking arrangement 10 to the locking pawl arrangement 5, without a high supporting force being required, such as at the toggle lever 12.

In another embodiment, the further crash locking surface 22 is a constituent part of a bearing mandrel which is a constituent part of the above pivot bearing 24 of the second blocking lever 10*b*.

Finally, in one or more embodiments, the case that the engagement surface 23 of the first blocking lever 10*a* and the further crash blocking surface 22 are designed in such a way that they can be brought into engagement with one another at least partially in a positively locking manner in the case of a crash. In this respect, slipping off of the engagement surface 23 from the further crash locking surface 22 is also avoided here.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 motor vehicle lock
2 latch
2 lock latch
3 closing part
4 locking mechanism
5 pawl assembly
6 pivot bearing
7 locking pawl
8 crash blocking surface
9 engagement surface
10 arrangement
12 toggle lever
13 carrier pawl
14 joint
15 lock housing
16 toggle lever mechanism
17 one locking surface
18 one engagement surface
19 pivot bearing
20 bearing journal
21 additional bulge
22 crash locking face
23 engagement surface
24 pivot bearing
2*a* lock latch axis
10*a* first blocking lever
10*b* second locking lever
10*b* second blocking lever While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A motor vehicle lock comprising:

a lock latch configured to be pivoted about a lock latch axis and moved to an open position and to at least one closed position, when the lock latch is in a mounted state and in a closed position of the at least one closed position, the lock latch is in holding engagement with a locking part, when the lock latch is in the open position, the lock latch releases the locking part;

a locking mechanism configured to move to a locked state, in which the locking mechanism locks the lock latch disposed in the closed position, and a release state, in which the locking mechanism releases the lock latch disposed in the open position, the locking mechanism including a locking pawl arrangement provided with a locking pawl pivotably mounted via a pivot bearing, the locking pawl is configured to engage and lock the lock latch;

a crash locking surface, wherein during normal operation an engagement surface of the locking pawl and the crash locking surface are disengaged from each other and wherein during a crash event, the engagement surface of the locking pawl and the crash locking surface come into engagement with each other in response to deformation-induced yielding of the locking pawl or the pivot bearing as a result of crash forces transmitted by the locking part so that at least a portion of crash forces are dissipated via the crash locking surface, wherein the locking pawl arrangement includes a carrier pawl pivotably connected to the locking pawl via a connecting joint, wherein the connecting joint forms the pivot bearing of the locking pawl, and wherein the crash locking surface is a constituent part of a bearing mandrel, the bearing mandrel is a constituent part of the pivot bearing of the carrier pawl.

2. The motor vehicle lock of claim 1, wherein the locking mechanism includes a blocking arrangement configured to block the locking pawl arrangement disposed in the locked state, the blocking arrangement including a first blocking lever and a second blocking lever coupled to one another via a toggle lever and forming a toggle lever mechanism configured to block the locking pawl arrangement.

3. The motor vehicle lock of claim 2, wherein the blocking arrangement is configured to be coupled to the locking pawl arrangement to block the locking pawl arrangement in a region of the connecting joint.

4. The motor vehicle lock of claim 2, wherein the first blocking lever is configured to be coupled to the locking pawl arrangement to block the locking pawl arrangement in a region of the connecting joint.

5. The motor vehicle lock of claim 1, wherein the locking pawl and the carrier pawl form a toggle lever mechanism via the connecting joint.

6. The motor vehicle lock of claim 1, wherein the locking pawl includes at least one locking surface configured to engage an engagement surface of the lock latch, the at least one locking surface spaced apart from a connecting joint, wherein a carrier pawl is mounted via a pivot bearing of the carrier pawl so that the carrier pawl is pivotable about a point spaced apart from the connecting joint.

7. The motor vehicle lock of claim 6, further comprising:

a lock housing, wherein the point is fixed with respect to the lock housing.

8. The motor vehicle lock of claim 1, wherein the pivot bearing of the locking pawl is at least partially formed of a plastic material.

9. The motor vehicle lock of claim 1, wherein at least a portion of the locking pawl is formed of a plastic material.

10. The motor vehicle lock of claim 9, wherein the locking pawl includes a metallic portion and a plastic portion, the metallic and plastic portions configured such that the metallic portion dissipates a substantial portion of the crash forces.

11. The motor vehicle lock of claim 1, wherein at least one part of the carrier pawl is formed of a plastic material.

12. The motor vehicle lock of claim 1, wherein the engagement surface of the locking pawl and the crash locking surface are collectively configured such that during the crash event the engagement surface of the locking pawl and the crash locking surface come into engagement with each other at least partially in a positively locking manner.

13. The motor vehicle lock of claim 1, wherein the crash locking surface is connected to a strike plate of the motor vehicle lock or is formed by the strike plate.

14. The motor vehicle lock of claim 1, further comprising:

a further crash locking surface, wherein during the crash event an engagement surface of the blocking arrangement and the further crash locking surface come into engagement with each other in response to deformation-induced yielding of the blocking arrangement as a result of crash forces transmitted by the locking part so that at least a portion of crash forces are dissipated via the further crash locking surface.

15. The motor vehicle lock of claim 14, further comprising:

the further crash locking surface, wherein the blocking arrangement includes a first blocking lever, the first blocking lever is configured to engage the further crash locking surface during the crash event such that at least a portion of the crash forces are dissipated via the second further crash locking surface.

16. The motor vehicle lock of claim 1, wherein the locking part is a striker.

17. A motor vehicle lock comprising:

a lock latch configured to pivot about a lock latch axis between an open position, in which the lock latch is disengaged from a striker, and a closed position in which the lock latch engages and holds the striker; and a locking mechanism configured to move to a locked state, in which the locking mechanism locks the lock latch disposed in the closed position, and a release state, in which the locking mechanism releases the lock latch disposed in the open position, the locking mechanism including a locking pawl arrangement provided with a carrier pawl, a locking pawl, and a pivot bearing, the locking pawl pivotably mounted to the pivot bearing, the locking pawl is configured to engage and lock the lock latch, wherein the carrier pawl is pivotably connected to the locking pawl via a connecting joint, wherein the connecting joint forms the pivot bearing of the locking pawl;

wherein a pivot bearing of the carrier pawl forms a crash locking surface, wherein during normal operation an engagement surface of the locking pawl and the crash locking surface are disengaged from each other and wherein during a crash event the engagement surface of the locking pawl and the crash locking surface come into engagement with each other in response to deformation-induced yielding of the locking pawl or the pivot bearing as a result of crash forces transmitted by the striker so that at least a portion of crash forces are dissipated via the crash locking surface.

* * * * *